United States Patent
Kamiya et al.

(10) Patent No.: US 6,833,056 B1
(45) Date of Patent: Dec. 21, 2004

(54) DESALINATION METHOD AND DESALINATION APPARATUS

(75) Inventors: Ichiro Kamiya, Tokyo (JP); Yuzo Narasaki, Kanagawa (JP); Tetsuo Kuroda, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/581,235
(22) PCT Filed: Dec. 24, 1998
(86) PCT No.: PCT/JP98/05861
§ 371 (c)(1), (2), (4) Date: Aug. 17, 2000
(87) PCT Pub. No.: WO99/33751
PCT Pub. Date: Jul. 8, 1999

(30) Foreign Application Priority Data

Dec. 25, 1997 (JP) .............................................. 9-367186
Apr. 1, 1998 (JP) ............................................ 10-088710

(51) Int. Cl.[7] .............................. B01D 1/00; B01D 3/10; B01D 3/42; C02F 1/04
(52) U.S. Cl. ................. 202/155; 159/44; 159/DIG. 16; 202/172; 202/176; 202/185.1; 202/205; 203/11; 203/71; 203/DIG. 8; 203/DIG. 11; 203/DIG. 17; 203/DIG. 18; 203/DIG. 20
(58) Field of Search .................................. 202/173, 174, 202/205, 186, 153–155, 156, 172, 176, 185.1; 159/39, 44, DIG. 16; 203/DIG. 20, DIG. 17, 71, 87, 11, DIG. 8, DIG. 11, DIG. 18; 60/648

(56) References Cited

U.S. PATENT DOCUMENTS 3,856,631 A * 12/1974 Smith, Jr. .................... 203/11
4,094,747 A * 6/1978 Pfenninger ................... 202/173
4,254,943 A * 3/1981 Bjorkman ..................... 266/149
4,401,512 A * 8/1983 Likins, Jr. .................... 198/132
4,525,242 A * 6/1985 Lida ............................ 202/173
4,799,461 A * 1/1989 Shigenaka et al. .......... 122/420
5,853,549 A * 12/1998 Sephton ........................ 203/2
6,309,513 B1 * 10/2001 Sephton ........................ 202/155

FOREIGN PATENT DOCUMENTS

EP    0 034 920    9/1981
EP    0 067 146    12/1982

(List continued on next page.)

OTHER PUBLICATIONS tsay et al , "Vacuum desalination for water purification using waste heat", CAPLUS 1996:549619.*

(List continued on next page.)

Primary Examiner—Virginia Manoharan
(74) Attorney, Agent, or Firm—Oblon, Spivak, McClelland, Maier & Neustadt, P.C.

(57) ABSTRACT

A desalination apparatus capable of obtaining fresh water stably at low cost by utilizing low-temperature waste, wherein the desalination apparatus including a heat exchanger 92 cooperating with an evaporation can 60 so as to subject a low-temperature waste heat 11 and raw water 62 in the evaporation can 60 to heat exchange and generate water vapor 63 in the evaporation can 60; a condenser 98 cooperating with a raw water tank 72 so as to receive the water vapor 63 from the evaporation can 60, cool the water vapor 63 by subjecting the water vapor 63 and raw water 71 in the raw water tank 72 to heat exchange and obtain distilled water 76; a distilled water tank for storing the distilled water 76; vacuum means for evacuating the evaporation can 60 and depressurizing the inside thereof so as to promote generation of water vapor 63 in the evaporation can 60; and raw water supply means for supplying raw water to the evaporation can.

11 Claims, 17 Drawing Sheets

FOREIGN PATENT DOCUMENTS

| | | | |
|---|---|---|---|
| FR | 2306941 | * | 11/1976 |
| GB | 819 025 | | 8/1959 |
| JP | 10-047015 | | 2/1998 |
| WO | WO 97/48646 | | 12/1997 |

OTHER PUBLICATIONS

Patent Abstracts of Japan, vol. 097, No. 006, Jun. 30, 1997, JP 09 052082, Feb. 25, 1997.

Patent Abstracts of Japan, vol. 097, No. 008, Aug. 29, 1997, JP 09 108653, Apr. 28, 1997.

H. Nishikawa, et al., pps. 321–322, "Practical Experimental Test of Solar Energy Distillation System," 1997.

T. Kawahara, et al., Proceedings of JSES/JWEA Joint Conference, pps. 337–340, "Performance Test of Solar Energy Distillation System," Nov. 28–29, 1997.

H. Nishikawa, et al., 1st International Conference on Energy and the Environment, pps. 347–354, "Triple Effect Evacuated Solar Still System for Getting Fresh Water from Seawater," 1997.

* cited by examiner

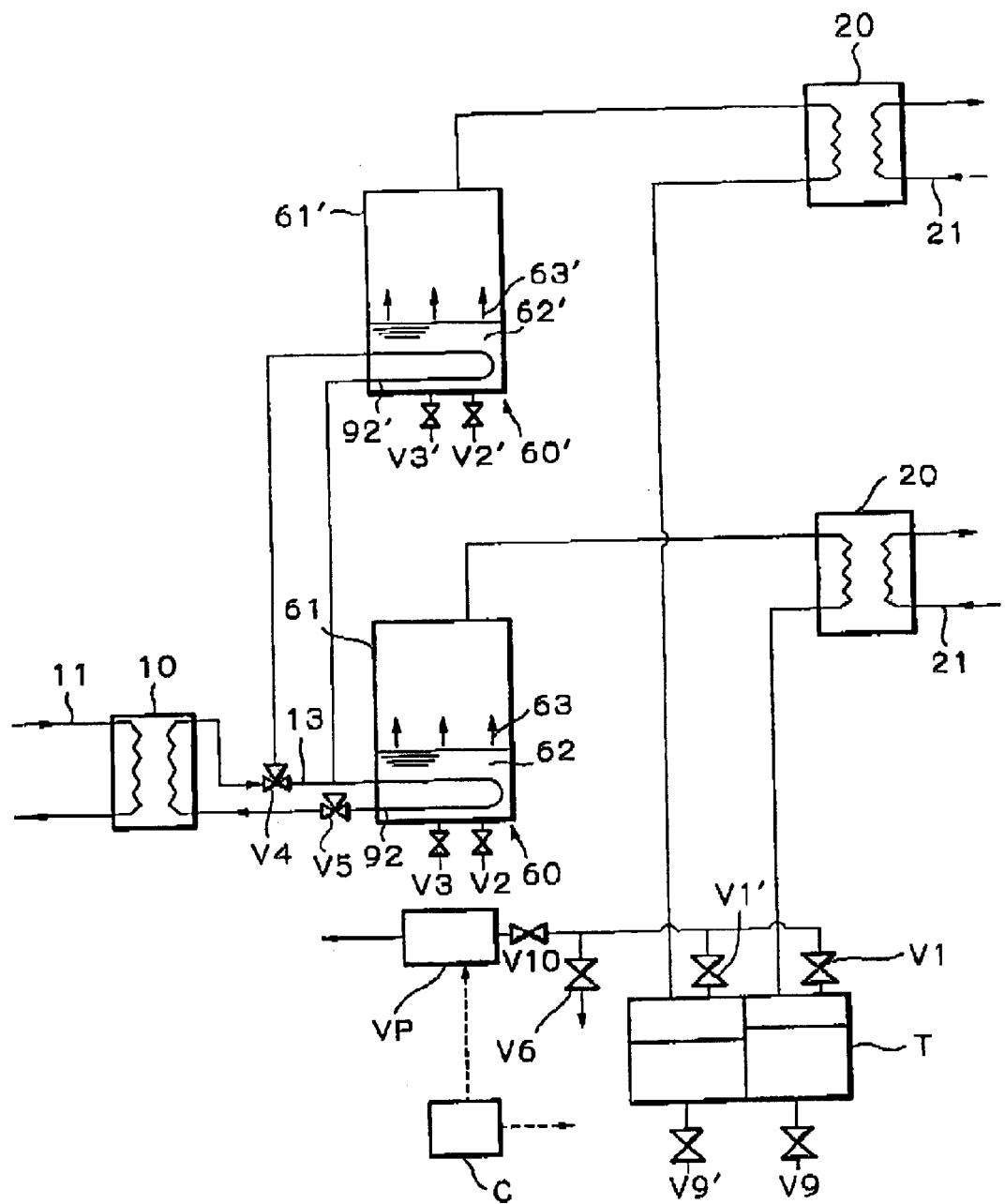

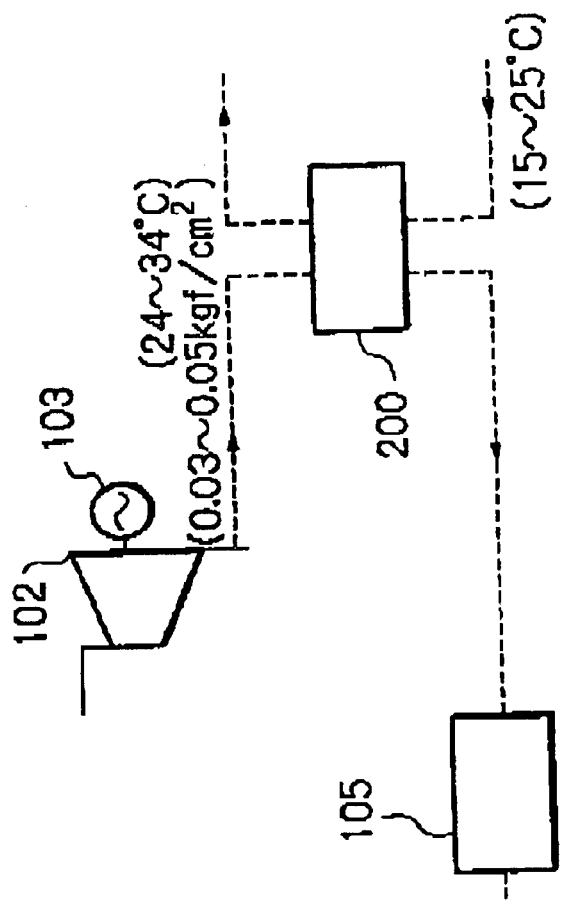
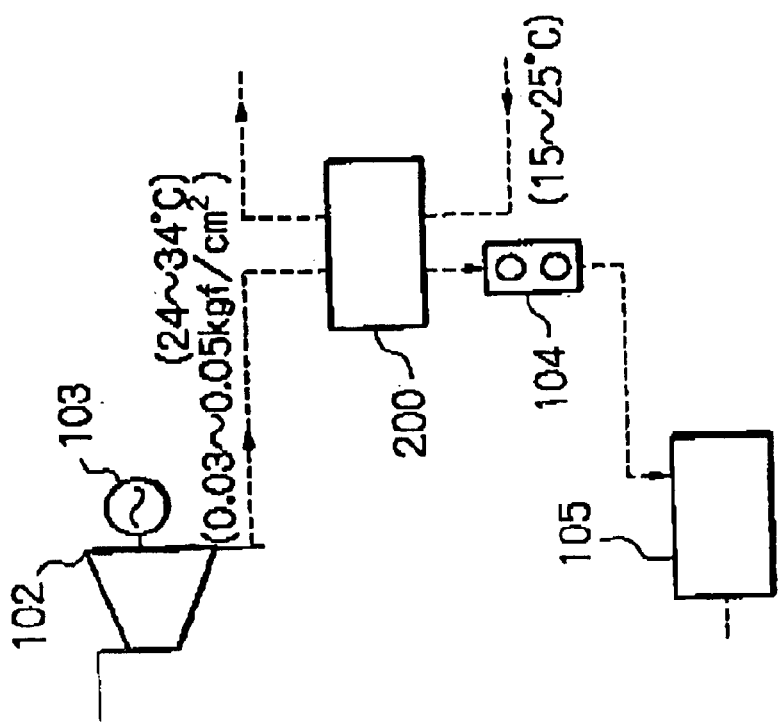

DESALINATION METHOD AND DESALINATION APPARATUS

TECHNICAL FIELD

The present invention relates to a desalination method and a desalination apparatus that are used for desalinating raw water (e.g. saline water, sea water) by utilizing a local unused waste heat source, or relates to a desalination method and a desalination apparatus that produce fresh water or suitable water, drinking water or demineralized water by softening hard water, for example.

BACKGROUND ART

In various facilities, e.g. plants and marine structures, agricultural land, in inland areas, islands and desert regions, it is difficult to obtain suitable water for industrial use, drinking water or agricultural water, and in many cases, it is necessary to transport water by ship or truck or to lay pipelines. In other cases, these facilities use, a membrane or other types of desalination apparatus that necessarily consume a large amount of electric energy.

While thermal or nuclear power plants and so forth reuse high-temperature waste heat to generate electricity from steam turbines, low-pressure steam and its potential heat energy is discharged as waste. In fact, various kinds of low-temperature heat exist, for example, local (regional) temperature differences, terrestrial heat, and fermentation heat.

Many plants or other facilities having a waste heat source as stated above require demineralized water or water having a low impurity content to operate. The technique of transporting such water by ship, truck or pipelines as stated above suffers from the problem that the cost of transportation, the construction costs and maintenance and management costs are high. Membranes or other types of desalination apparatus consume a large amount of electric energy, and this also contributes to high operation costs.

In order to efficiently desalinate saline or hard water, vacuum evaporation type desalination apparatuses have been proposed.

As conventional vacuum evaporation type desalination apparatuses in particular, those which use a flash system or a multiple-effect can system have been proposed.

However, conventional flash or multiple-effect desalination apparatuses suffer from the disadvantage that the amount of water used for cooling in condensers is large, and the amount of water discharged is correspondingly large, resulting in the need for a great amount of pump power.

In a flash system, if the difference in temperature between a heat source used and cooling water is small, efficiency becomes low, and it is difficult to realize an efficient multiple-effect system. Similarly, the conventional multiple-effect can system suffers from the disadvantage that if a temperature difference between a heat source used and cooling water is small, it is impossible to increase the number of cans used to form a multiple-effect desalination apparatus. Accordingly, it is difficult to improve efficiency. Consequently, in a case where a temperature difference between a heat source used and cooling water is small, it is necessary to increase the heat transfer surface area of the apparatus. This causes a rise in installation costs and necessitates the use of a large installation area.

Furthermore, because both the systems use a continuous operation mode, it is necessary to run a fluid transfer pump, a vacuum pump, etc. at all times. Consequently, the amount of power consumed in the whole system is large, and efficiency is low. Regarding a vacuum pump in particular, because a high degree of vacuum is produced in a low-temperature condition, a large amount of water vapor is entrained in the extracted gas. Therefore, a large capacity vacuum pump which consumes a large amount of power is required.

The present invention was made in view of the above-described circumstances, and it is an object of the present invention to provide a desalination method and a desalination apparatus capable of producing fresh water stably at reduced cost by making cascade use of low-temperature waste heat as an energy source, which has heretofore been disposed of without being used.

DISCLOSURE OF INVENTION

To solve the above-described problems, according to a first aspect of the invention, a desalination method for raw water comprising the steps of: (1) supplying raw water into a confined space means; (2) evacuating the confined space means and depressurizing an inside thereof; (3) supplying low-temperature waste heat into the confined space means so as to subject the low-temperature waste heat and the raw water in the confined space means to heat exchange and generate water vapor in the confined space means; and (4) cooling the water vapor to obtain a distilled water.

The confined space means may comprise a single evaporation can.

Instead, the confined space means may comprise a plurality of evaporation cans which are connected in series, wherein the low-temperature waste heat is supplied into a first evaporation can, and wherein in each pair of adjacent evaporation cans, the downstream-side evaporation can receives water vapor from an upstream-side evaporation can, cools the water vapor with raw water in the downstream-side evaporation can and thereby produces distilled water, and also heats the raw water in the downstream-side evaporation can and generates water vapor.

The confined space means may comprises a plurality of evaporation cans which are connected in parallel rows, wherein the steps of (1) to (4) above are switched over from one evaporation can to another to thereby enable a continuous desalinating operation.

In the method described above, the step of evacuating may be effected intermittently or at optional time, for example, for a predetermined period during the time of starting the desalinating operation.

The step of supplying raw water into the confined space means could be effected by evacuating the confined space means while opening the confined space means to a raw water source. The method further may comprise a step of discharging concentrated raw water out of the confined space means and this step may be effected, after opening the confined space means to the atmosphere, by opening the confined space means and allowing flowing down of the concentrated raw water therefrom.

According to a second aspect of the invention, a desalination apparatus includes a heat exchanger cooperating with an evaporation can so as to subject low-temperature waste heat and raw water in the evaporation can to heat exchange and generate water vapor in the evaporation can; a condenser cooperating with a raw water tank to receive the water vapor from the evaporation can, cool the water vapor by subjecting the water vapor and raw water in the raw water tank to heat exchange and obtain distilled water; a distilled water tank for storing the distilled water; vacuum means for evacuating the evaporation can and depressurizing the inside thereof so as to promote generation of water vapor in the evaporation can; and raw water supply means for supplying raw water to the evaporation can.

According to a further aspect of the invention, a desalination apparatus includes a heat exchanger cooperating with an evaporation can so as to subject low-temperature waste heat and raw water in the evaporation can to heat exchange and generate water vapor in the evaporation can; a condenser adapted to receive the water vapor from the evaporation can, cool the water vapor by subjecting the water vapor and cooling water to heat exchange and obtain distilled water; a distilled water tank for storing the distilled water; vacuum means for evacuating the evaporation can and depressurizing the inside thereof so as to promote generation of water vapor in the evaporation can; and raw water supply means for supplying raw water to the evaporation can.

In the desalination apparatus described above, the low-temperature waste heat may consist of the potential heat of exhaust steam from a steam turbine for electric power generation in a plant.

The desalination apparatus may be incorporated in series and/or parallel with a condenser of the steam turbine for electric power generation, or can be used in place of the condenser. In a case where the desalination apparatus is used in place of the condenser, it is not easy for only one set of desalination apparatus to treat a large amount of exhaust steam as discharged from an electric power plant. Therefore, a plurality of desalination apparatuses may be used, by being incorporated in parallel.

In the desalination apparatus stated above, a plurality of evaporation cans may be provided, wherein the heat exchanger is arranged to cooperate with a first evaporation can, and the condenser is arranged such that in each pair of adjacent evaporation cans, the downstream-side evaporation can receives water vapor from an upstream-side evaporation can, cools the water vapor with raw water in a downstream-side evaporation can and thereby produces distilled water, and also heats the raw water in the downstream-side evaporation can and generates water vapor.

The desalination, apparatus may include control means for controlling the operation of the vacuum means and opening and closing of a control valve connected to the evacuation can.

The control means may control the vacuum means and the control valve so that evacuation of the evaporation can and opening of the evaporation can to the atmosphere are intermittently repeated, thereby enabling a batch (intermittent) operation.

In the desalination apparatus stated above, a plurality of evaporation cans may be disposed in parallel rows each consisting of at least one evaporation can, and the control means may control the vacuum means and the control valve so that the evaporation cans in the rows are not simultaneously opened to the atmosphere, thereby enabling a continuous operation of the desalination apparatus. Such continuous operation may be either a rated operation or an operation following variations in waste heat (heat source).

In the desalination apparatus stated above, the raw water supply means may be formed by vacuum means and a control valve connected to the evaporation can which is opened or closed by the control means.

The desalination apparatus may further include concentrated raw water or waste brine discharge means for discharging concentrated raw water from the evaporation can. The concentrated raw water discharge means may be formed by a control valve connected to a lower part of the evaporation can that is opened or closed by the control means.

In the desalination apparatus stated above, the evaporation can, heat exchanger, condenser, distilled water tank, vacuum means and raw water supply means may be unitized in a single frame. In the case that the desalination apparatus further includes a concentrated raw water discharge means, it is possible to further incorporate a concentrated raw water discharge means in a single frame.

A plurality of desalination apparatus thus unitized in a single frame may be further assembled in a single unit.

Since the desalination apparatus of the present invention uses a low-temperature waste heat source that has heretofore been unused as a heat source, for example, low-temperature waste heat from a thermal or nuclear power plant, it is, therefore, possible to effectively use such heat, which has heretofore been disposed of.

In addition, it is possible to ensure extremely stable supply of a heat source and a cooling source and to perform stable desalination by utilizing low-temperature waste heat discharged from a thermal or nuclear power plant as a heat source and also by utilizing sea water as a cooling source for the condenser in the final stage, making use of the conditions of location of thermal or nuclear power plants, which are installed by the sea in view of the transport of a power generating fuel and ensuring a place where waste heat is disposed of (i.e. heat radiating source).

Further, the cascade use of a low-temperature waste heat source, which is an energy source heretofore unused, makes it possible to suppress the use of fossil fuels and to minimize the generation of global warming gases. Thus, it is possible to provide a resource-recovering technique by desalination that is friendly to the global environment.

According to the present invention, raw water is stored in an evaporation can, the inside of the evaporation can is depressurized by a vacuum pump, and the raw water is heated with low-temperature waste heat. This enables evaporation to be promoted at a low temperature. Accordingly, it is possible to effect desalination by using low-temperature waste heat produced by an electric power plant or the like.

In addition, since evaporation can be carried out at a low-temperature, even if the temperature difference between a heat source used and cooling water is small, the evaporation efficiency can be improved by employing a multiple-effect evaporation can system and repeatedly using heat.

Furthermore, because raw water stored in a can is evaporated, an intermittent or batch operation can be performed. Accordingly, power consumption can be reduced markedly. In particular, if the apparatus is operated by a batch mode and if the inside of the apparatus is evacuated at the time of starting the operation, and the inside of the apparatus is opened to the atmosphere upon the termination of the operation, it is possible to supply raw water into the apparatus and to discharge concentrated water out of the apparatus by actuating and stopping operation of the vacuum means. Therefore, the apparatus can basically be operated by the operation of the vacuum pump alone. Accordingly, power consumption can be further reduced.

Furthermore, a continuous operation can be performed by operating in batch mode a plurality of apparatuses arranged in parallel by changing them over from one to another.

Furthermore, because the apparatus can be operated with high efficiency and with low power, the whole apparatus can be unitized in a compact unit. Accordingly, it is possible to make transportation, carrying in and installation of the apparatus easy.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIG. 5 is a diagram showing a first basic structural example of an evaporation can used in the desalination apparatus according to the present invention, wherein

FIG. 7 is a view showing a third basic structural example of an evaporation can used in the desalination apparatus according to the present invention, wherein

FIG. 9 is a diagram showing another structural example of the desalination apparatus according to the present invention.

FIGS. 10A–10C respectively show a diagram showing a structural example of a system in which low-temperature and low-pressure steam discharged from a condensing turbine of an electric power plant is utilized as a heat source for the desalination apparatus according to the present invention.

BEST MODE FOR CARRYING OUT THE INVENTION

Figure 1:
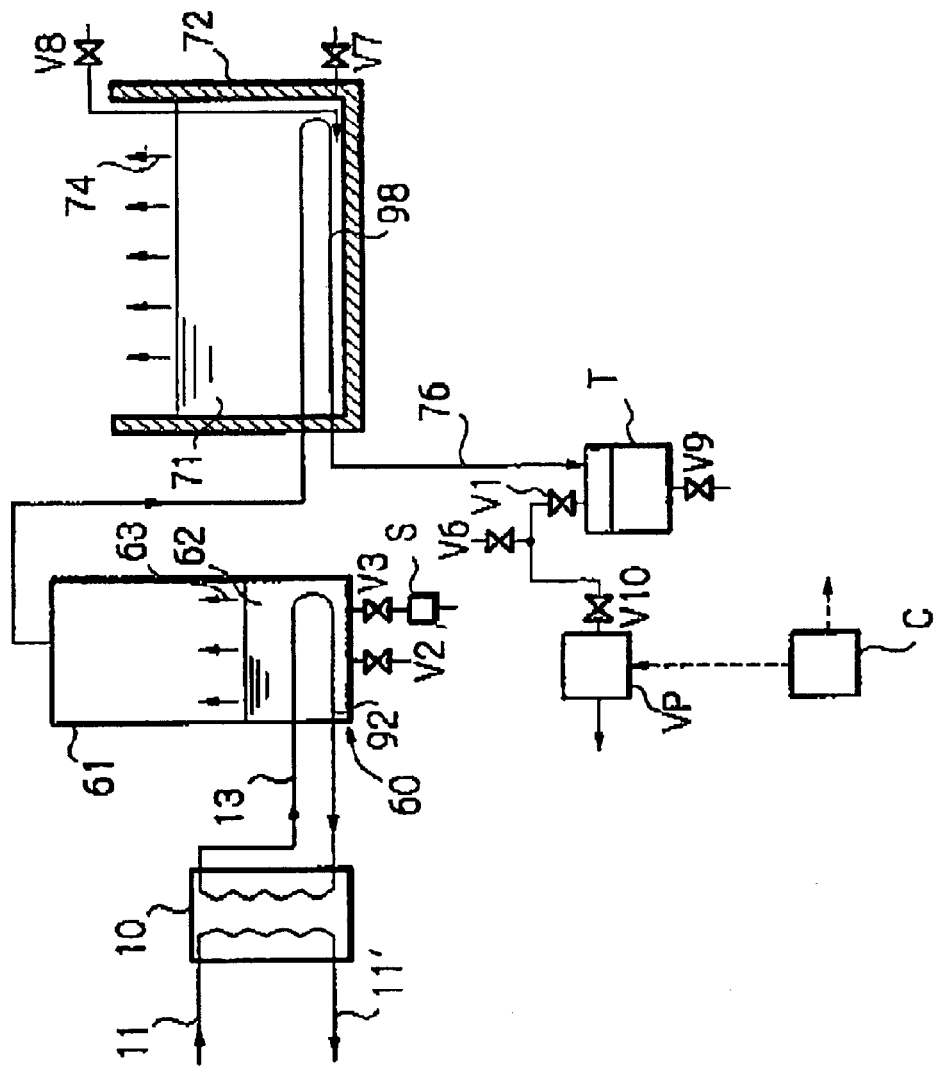
FIG. 1 is a diagram showing a basic structural example of the desalination apparatus according to the present invention.

Embodiments of the present invention will be described below with reference to the accompanying drawings. FIG. 1 is a diagram showing a basic structural example of the desalination apparatus according to the present invention. As shown in FIG. 1, the desalination apparatus has a heat exchanger 10, an evaporation can 60, and a raw water tank 72. A low-temperature waste heat source 11 from a thermal or nuclear power plant or other power generation facilities is introduced into the heat exchanger 10 to perform heat exchange between the low-temperature waste heat source 11 and a heating medium 13 to thereby heat the heating medium 13. The heated heating medium 13 is introduced into a heat exchanger 92 placed in raw water 62 in the evaporation can 60 to perform heat exchange between the heating medium 13 and the raw water 62, thereby heating the raw water 62 and thus generating water vapor 63. The heating medium 13 itself is cooled and returns to the heat exchanger 10. Reference numeral 11' shows a waste heat condensate or brine.

The water vapor 63 generated in the can body 61 of the evaporation can 60 is collected and introduced into a condenser 98 placed in raw water 71 in the raw water tank 72 to perform heat exchange between the water vapor 63 and the raw water 71. The water vapor 63 condenses to distilled water 76 and also heats the raw water 71. The distilled water is accumulated in a distilled water tank T. The inside of the can body 61 of the evaporation can 60 is depressurized with a vacuum means, e.g. a vacuum pump VP, via the distilled water tank T and a control valve V1, V10. Thus, the raw water 62 in the can body 61 is subjected to heat exchange with the heating medium 13 under the reduced pressure. Therefore, the water vapor 63 is generated with high efficiency.

In the above-described desalination apparatus, the low-temperature waste heat source 11 is introduced into the heat exchanger 10 to heat the heating medium 13, and the heating medium 13 and the raw water 62 are subjected to heat exchange through the heat exchanger 92. That is, heat exchange is indirectly performed between the low-temperature waste heat and the raw water. However, the arrangement may be such that the low-temperature waste heat source 11 is introduced into the heat exchanger 92 so as to perform heat exchange directly between the low-temperature waste heat source 11 and the raw water 62.

Figure 2:
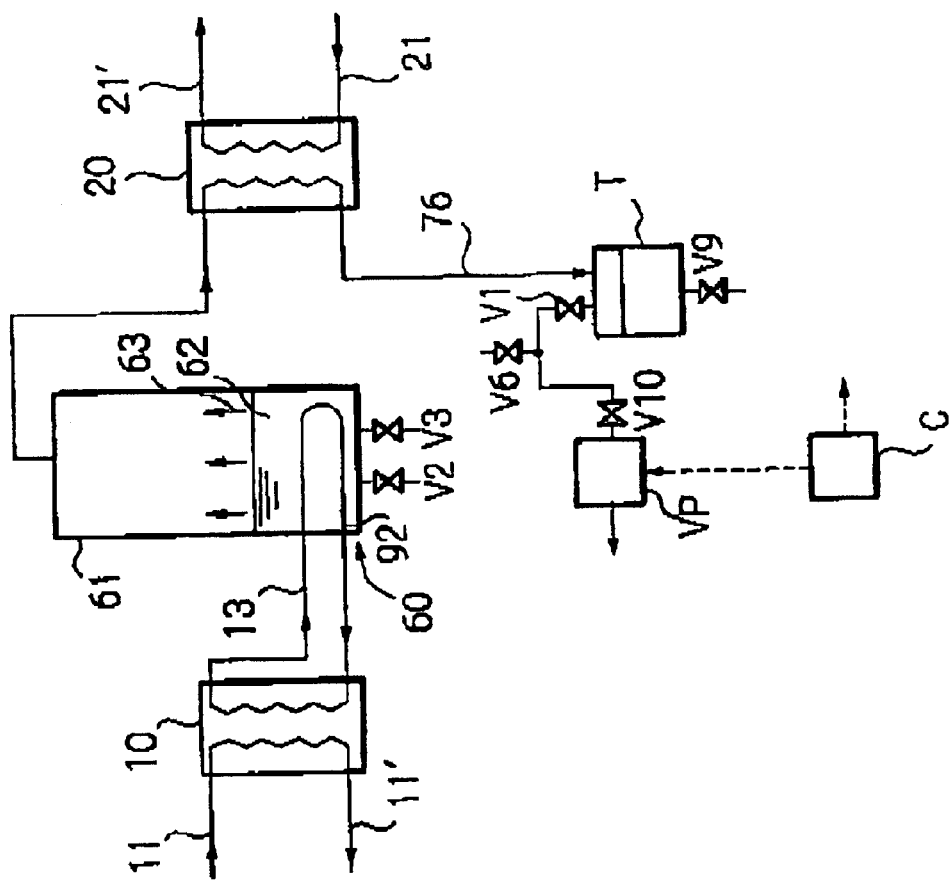
FIG. 2 is a diagram showing another basic structural example of the desalination apparatus according to the present invention.

FIG. 2 is a diagram showing another basic structural example of the desalination apparatus according to the present invention. As shown in FIG. 2 the desalination apparatus has a heat exchanger 10, an evaporation can 60 and a condenser 20. A low-temperature waste heat source 11 from a thermal or nuclear power plant or other power generation facility is introduced into the heat exchanger 10 to perform heat exchange between the low-temperature waste heat source 11 and a heating medium 13 and thereby heat the heating medium 13. The heated heating medium 13 is introduced into a heat exchanger 92 placed in raw water 62 in the evaporation can 60 to perform heat exchange between the heating medium 13 and the raw water 62, thereby heating the raw water 62 and thus generating water vapor 63. The heating medium 13 itself is cooled and returns to the heat exchanger 10.

The water vapor 63 generated in the can body 61 of the evaporation can 60 is collected and introduced into the condenser 20 to perform heat exchange between the water vapor 63 and cooling water 21. The water vapor 63 condenses to distilled water 76 and the distilled water is accumulated in a distilled water tank T. The inside of the can body 61 of the evaporation can 60 is depressurized with a vacuum means, e.g. a vacuum pump VP, via the distilled water tank T and a control valve V1, V10. Thus, the raw water 62 in the can body 61 is subjected to heat exchange with the heating medium 13 under the reduced pressure. Therefore, the water vapor 63 is generated with high efficiency.

In the above-described desalination apparatus, the low-temperature waste heat source 11 is introduced into the heat exchanger 10 to heat the heating medium 13, and the heating medium 13 and the raw water 62 are subjected to heat exchange through the heat exchanger 92. That is, heat exchange is indirectly performed between the low-temperature waste heat source 11 and the raw water 62. However, the arrangement may be such that the low-temperature waste heat source 11 is introduced into the heat exchanger 92 so as to perform heat exchange directly between the low-temperature waste heat source 11 and the raw water 62. The reference numeral 21' shows a returning cooling water.

Figure 3:
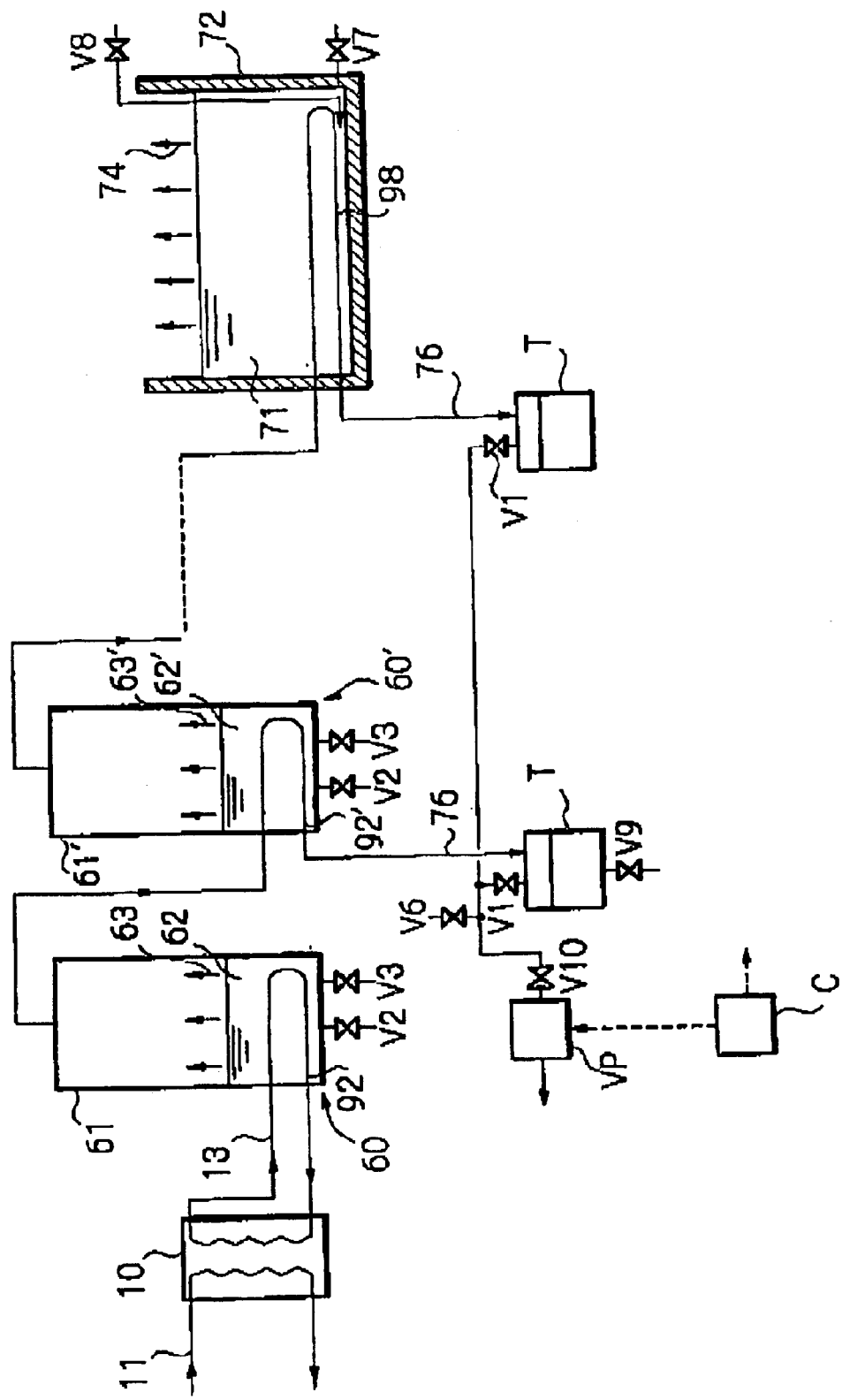
FIG. 3 is a diagram showing a further basic structural example of the desalination apparatus according to the present invention.

FIG. 3 is a diagram showing another basic structural example of the desalination apparatus according to the present invention. As shown in FIG. 3, the desalination apparatus has a heat exchanger 10 and a plurality of evaporation cans 60, 60' . . . arranged in a multistage structure. A low-temperature waste heat source 11 is introduced into the heat exchanger 10 to perform heat exchange between the low-temperature waste heat source 11 and a heating medium 13 and thereby heat the heating medium 13. The heated heating medium 13 is introduced into a heat exchanger 92 placed in raw water 62 in the evaporation can 60 in the first stage to perform heat exchange between the heating medium 13 and the raw water 62, thereby heating the raw water 62 and thus generating water vapor 63. The heating medium 13 itself is cooled and returns to the heat exchanger 10.

The water vapor 63 generated in the evaporation can 60 in the first stage is collected and introduced into a condenser (heat exchanger) 92' placed in raw water 62' in the evaporation can 60' in the second stage to perform heat exchange between the water vapor 63 and the raw water 62', thereby heating the raw water 62' and thus generating water vapor 63'. The water vapor 63 itself is recovered in a distilled water tank T as distilled water 76. The evaporation cans in the third and later stages also have a function similar to the above. That is, condensers cooperating with evaporation cans are arranged such that in each pair of adjacent evaporation cans, the downstream-side evaporation can receives water vapor from the upstream-side evaporation can to cool the water vapor with raw water in the downstream-side evaporation can and thereby produce distilled water, and also heat the raw water in the downstream-side evaporation can and generate water vapor.

At the final stage, the water vapor is introduced into a condenser 98 placed in raw water 71 in the raw water tank 72 to perform heat exchange between the water vapor and the raw water 71 to produce distilled water 76, which is, in turn, accumulated in a distilled water tank T.

Figure 4:
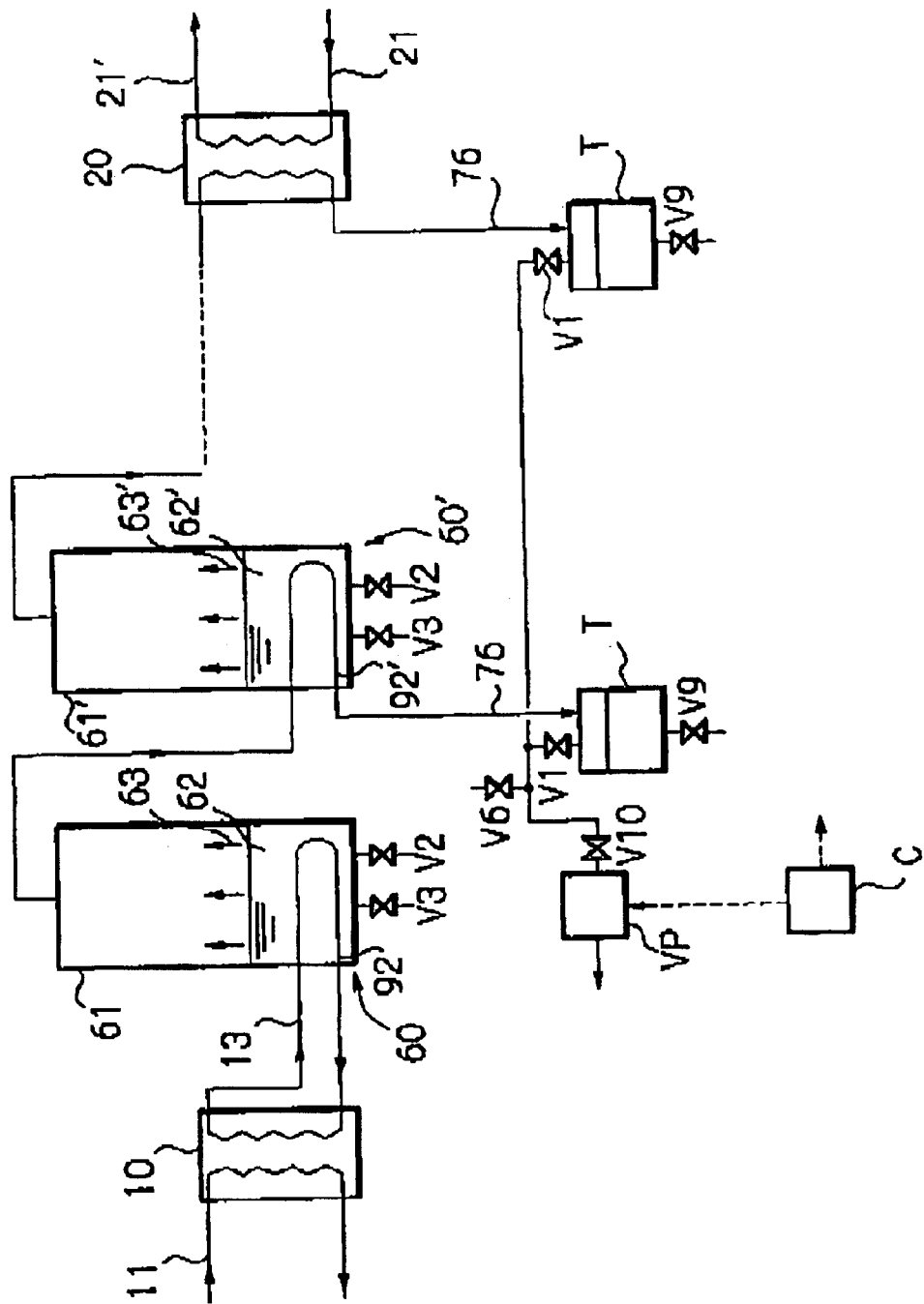
FIG. 4 is a diagram showing a further basic structural example of the desalination apparatus according to the present invention.

FIG. 4 is a diagram showing further basic structural example of the desalination apparatus according to the present invention. The arrangement and function of this apparatus are same as those of the apparatus shown in FIG. 3, except for the final stage thereof. That is, as shown, in this example, at the final stage, the water vapor is introduced into a condenser 20 to perform heat exchange between the water vapor and the cooling water 21 to produce distilled water 76.

Figure 5A:
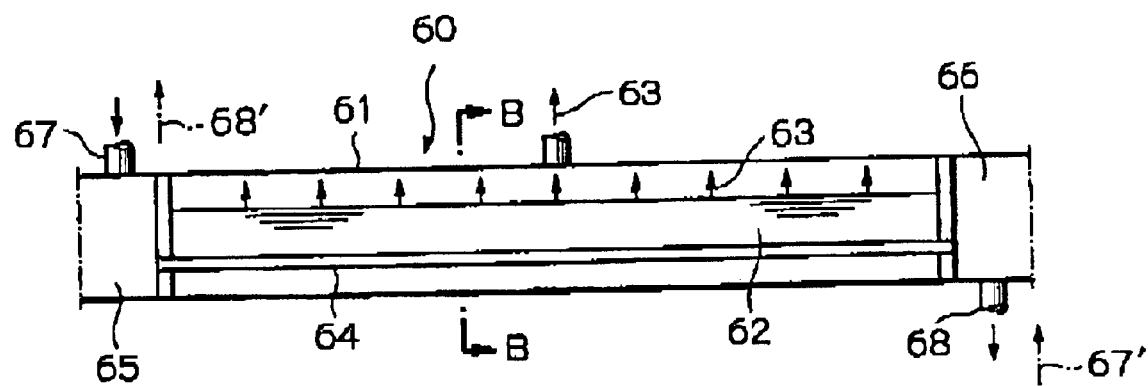
FIG. 5A is a longitudinal sectional view of the evaporation can and FIG. 5B is a sectional view taken along line B—B in FIG. 5A.
Figure 5B:
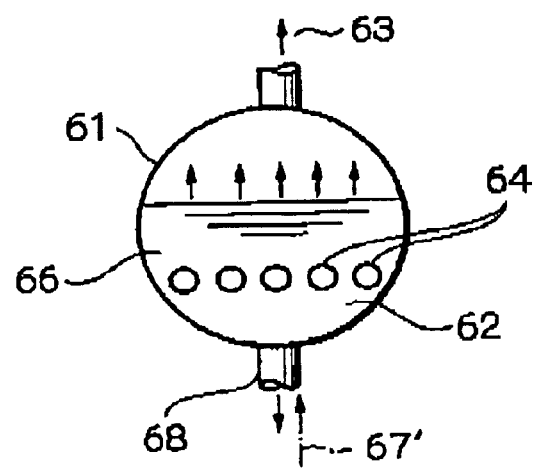

FIGS. 5A and 5B are diagrams showing a first basic structural example of the evaporation can 60. As shown in FIGS. 5A and 5B, the evaporation can 60 has at least one heat transfer tube 64 extending horizontally in a can body 61 installed horizontally. At both ends of the heat transfer tube 64, chambers 65 and 66 are provided for installing heat transfer tubes 64 collectively. One chamber 65 is provided with a heating medium vapor inlet or water vapor inlet 67, and the other chamber 66 is provided with a condensed heating medium outlet or condensate outlet 68. The inside of the heat transfer tube 64 is used as a heat radiation part for the heating medium or as a condensation part for water vapor, and the outside of the heat transfer tube 64 is used as a heating and evaporation part for raw water 62.

Thus, the evaporation can 60 has heating and evaporation parts integrated into one part and is arranged in a horizontal form. Consequently, the structure of the evaporation can is simplified, and high performance can be obtained even if the temperature difference is small. The heat transfer tube 64 may be formed in another configuration that is able to withstand a vacuum and which exhibits excellent heat transfer characteristics. The evaporation can 60 arranged as stated above may be placed at a tilt as a whole such that the outlet 68 for the condensed heating medium or condensate is positioned below the inlet 67 for the heating medium vapor or water vapor so that the condensate in the heat transfer tube 64 can be discharged easily, although this arrangement is not shown in the figure.

By placing the whole evaporation can 60 at a tilt as stated above, the condensate in the heat transfer tube 64 is discharged from the outlet 68 without any detention. In a case where the heating medium is used in a liquid phase, the arrangement may be such that a high-temperature heating medium liquid inlet 67' is located at a lower position, and a low-temperature heating medium liquid outlet 68' is located at an upper position.

The heated heating medium output from the heat exchanger 10 is introduced into the heat transfer tube 64 through the inlet 67 or the high-temperature heating medium liquid inlet 67'. The heating medium subjected to heat radiation is discharged from the outlet 68 or the low-temperature heating medium liquid outlet 68' and returned to the heat exchanger 10. In the case of multiple-effect evaporation cans 60, as shown in FIGS. 3 and 4, water vapor 63 generated in the evaporation can 60 in the preceding stage is introduced into the heat transfer tube 64 from the inlet 67, and distilled water is discharged from the outlet 68 of the evaporation can 60 in the succeeding stage.

Figure 6:
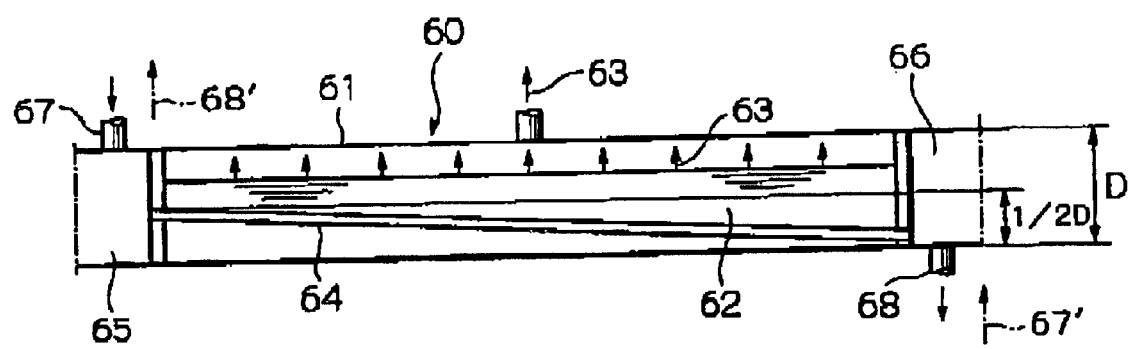
FIG. 6 is a longitudinal sectional view showing a second basic structural example of an evaporation can used in the desalination apparatus according to the present invention.

FIG. 6 is a diagram showing a second basic structural example of the evaporation can 60. Constituent elements common to FIGS. 5 and 6 are denoted by common reference characters. The heat transfer tube 64 is placed in the can body 61 to extend at a tilt to the horizontal direction or the bottom surface of the evaporation can 60. The steam outlet 68 is positioned below the steam inlet 67. In a case where the heating medium is used in a liquid phase, the evaporation can 60 may also be arranged such that the high-temperature heating medium liquid inlet 67' is located at a lower position, and the low-temperature heating medium liquid outlet 68' is located at an upper position.

By placing the heat transfer tube 64 at a tilt as stated above, the condensate in the heat transfer tube 64 Is discharged through the outlet 68 without any detention. If the heat transfer tube 64 is placed within a lower half of the diameter D of the can body 61 and the liquid level of the raw water 62 is set approximately at the center of the can body 61, the evaporation area can be maximized, and distilled water of good quality can be obtained without entrainment of mist.

Figure 7A:
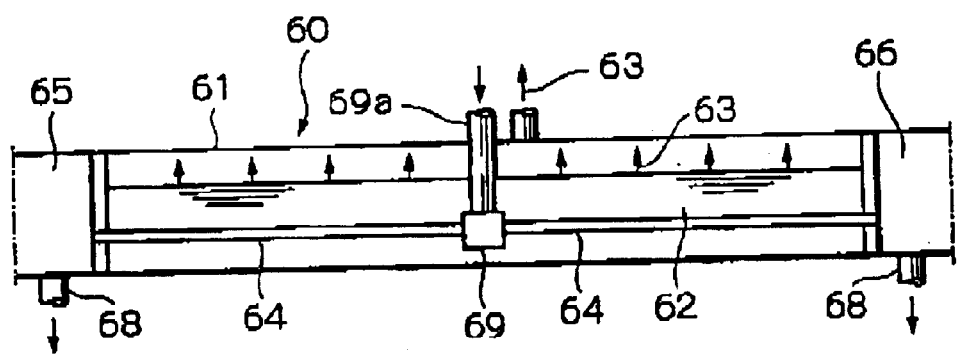
FIG. 7A is a longitudinal sectional view of the evaporation can and FIG. 7*b* is a plan view of the same.
Figure 7B:
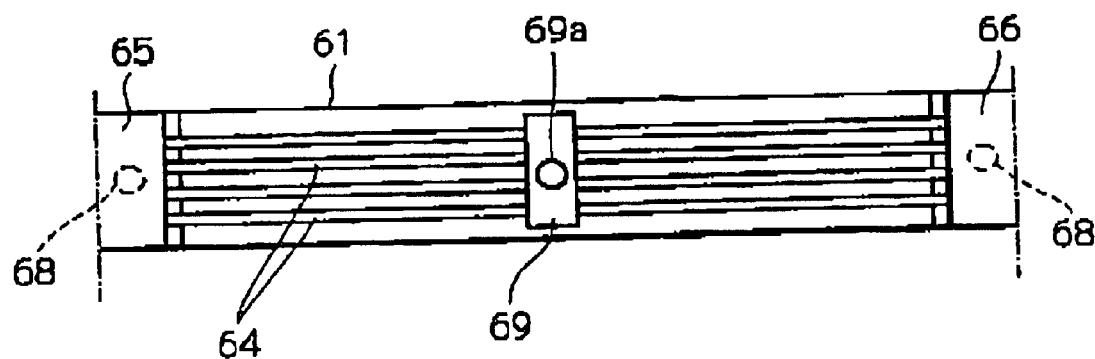

FIGS. 7A and 7B are diagrams showing a third basic structural example of the evaporation can 60. Constituent elements common to FIGS. 5, 6 and 7 are denoted by common reference characters. The evaporation can 60 has at least one set of heat transfer tubes 64 placed in a can body 61 installed horizontally. A chamber 69 is provided in the center of the can body 61 to install the heat transfer tubes 64 collectively, and at both sides in the evaporation can 60, chambers 65 and 66 are provided for installing the heat transfer tubes 64 collectively. The chamber 69 in the center is provided with an inlet 69a for the heating medium vapor or water vapor. The chambers 65 and 66 at both sides are provided with respective outlets 68 for the condensed heating medium or condensate.

By virtue of the arrangement of the evaporation can 60 in FIG. 7, even in a case where the can body 61 of the evaporation can 60 is long and accordingly the heat transfer tubes 64 become long, the pressure loss in the condensation part will not be increased, and the heating medium or distilled water can be discharged easily.

Figure 8:
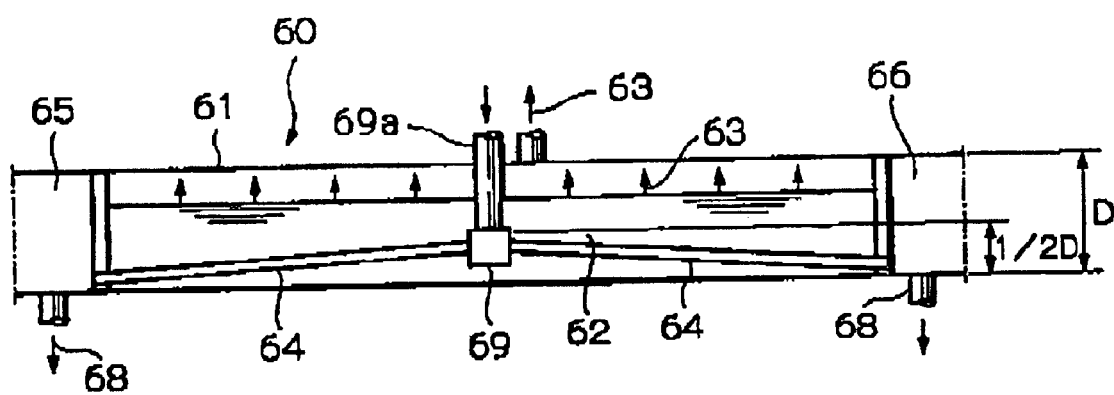
FIG. 8 is a longitudinal sectional view showing a fourth basic structural example of an evaporation can used in the desalination apparatus according to the present invention.

FIG. 8 is a diagram showing a fourth basic structural example of the evaporation can 60. Constituent elements common to FIGS. 5 to 8 are denoted by common reference characters. The evaporation can 60 has heat transfer tubes 64 placed in the can body 61 at a tilt with respect to the horizontal direction. The outlets 68 are positioned below a chamber 69 communicated with a central inlet 69a. The arrangement of the evaporation can 60, shown in FIG. 8, enables the condensate in the heat transfer tubes 64 to be discharged without any detention. In addition, the liquid level of the raw water 62 can be set approximately at the center of the can body 61, and hence the evaporation area can be maximized. Therefore, distilled water of good quality can be obtained without entrainment of mist.

Although only the construction of the evaporation can 60 in the first stage is explained above, the same or a similar construction may be adopted in the evaporation cans 60', 60" - - - in the second or later stages.

Also, it should be noted that raw water supplied to the evaporation can 60 and the raw water tank 72 is saline water (e.g. sea water) or hard water, and the concentrated raw water may be discharged from the evaporation can 60 and the raw water tank 72 at optional time or periodically through a control valve V2, V7 connected to the lower part thereof by a discharging means (not shown), and at the same time, raw water may be supplied at an optional time or periodically through another control valve V3, V8 connected thereto by a raw water supply means, e.g. a pump S(only one is shown) so that a predetermined level is kept within the evaporation can 60 and the raw water tank 72.

The concentrated raw water 62,71 in the evaporation can 60 and the raw water tank 72 may be discharged by natural flow down from a lower part of the evaporation can 60 and the raw water tank 72 via a control valve V2, V7 connected thereto at an optional time or periodically by a predetermined amount, and at the same time, raw water may be externally supplied into the evaporation can 60 and the raw water tank 72, where the temperature is low, through another control valve V3, V8 by a raw water supply means S (only one is shown) so that the water surface of the raw water 62, 71 is kept at a constant level. In this case, a concentrated raw water discharge means may be constituted by the control valve V2, V7 connected to the lower part of the evaporation can 60 or the raw water tank 72.

Further, the raw water may be supplied into the evaporation can 60 by opening a control valve V3 connected to the lower part of the evaporation can 60 and depressurizing the inside of the evaporation can by the vacuum pump VP. That is, in a preparation stage before evaporation operation, a raw water supply may be effected simultaneously with the evacuation of the evaporation can. In this case, the raw water supply means is constituted by the control valves V1, V3, V10 and the vacuum pump VP. Operation of the vacuum pump VP and the opening and closing of these control valves V1–V10 are controlled by a controller C.

It should be noted that the system is so arranged that the distilled water 76, which is obtained by condensing the water vapor 63 generated in the can body 61 of the evaporation can 60, is stored in a distilled water tank T and is supplied to each place where distilled water is required by opening a valve V9 after the operation of the apparatus is over and the inside of the apparatus is opened to an atmosphere.

The low-temperature waste heat source used in the above-described desalination apparatus is a heat source having thermal energy that requires a certain amount of externally supplied energy in order to obtain steam for use in driving a turbine. The low-temperature waste heat source includes exhaust steam from a steam turbine for electric power generation in a nuclear power plant or a thermal power plant. The low-temperature waste heat source should preferably not be heat extracted from a halfway point in the cycle of an electric power plant (extracting heat from a halfway point in the cycle causes power generation efficiency to be reduced), but rather, the desalination apparatus should preferably use an unused low-temperature waste heat source that is discharged from a condenser and which would otherwise be disposed of, thus having no effect on power generation efficiency.

As a low-temperature waste heat source, usually a waste heat ranging from 50° C. to 60° C. may be obtained. However, the desalination apparatus of the present invention provides a sufficient performance if the waste heat used in the apparatus has a temperature of around 30° C. as will be explained by referring to a later embodiment.

The desalination apparatus arranged as stated above may be continuously operated 24 hours a day. However, the desalination apparatus may also be operated, for example, as follows. First, a predetermined amount of raw water 62 is supplied into the evaporation can 60 by operating the raw water supply means, and the evaporation can 60 is evacuated by opening the valves V1, V10 and by operating the vacuum pump VP. After a predetermined degree of vacuum has been produced in the evaporation can 60, the valves V1 and V10 are closed, operation of the vacuum pump VP is stopped, and supply of the low-temperature waste heat source 11 commences. Consequently, evaporative distillation starts immediately. As stated above, evacuation of the evacuation can 60 and supply of raw water 62 into the evaporation can may be started simultaneously by operating the vacuum pump VP and the control valves V1, V3, V10. In the case of a batch operation, the system is subjected to gas extraction properly, or in an optional time, during the operation of the desalination apparatus, because in the early stages of evacuation, non-condensible gas in the raw water 62, which will obstruct heat transfer during evaporation and condensation, cannot be properly extracted.

After evaporative distillation has been performed to a predetermined concentration, the concentrated raw water 62 is discharged in order to prevent deposition of salt. This may be performed by opening a control valve V2 connected to the lower part of the evaporation can after opening the apparatus to the atmosphere by opening the valves V1 and V6 and by allowing natural flow down of the concentrated raw water therefrom. Then, after closing the valve V6, new raw water is again supplied into the evaporation can by operating the vacuum pump VP and the control valves V1, V3, V10 as stated above and, by further evacuating the evaporation can by the vacuum pump, evaporative distillation can be continued. In this case, power needed in the desalination apparatus is mainly the power required for the evacuation, and the vacuum pump VP is operated only in a predetermined period at the beginning portion of the operation to establish a predetermined vacuum degree. Thus, once a predetermined amount of raw water 62 is supplied into the evaporation can 60 and evacuation is effected to a predetermined degree of vacuum, evaporative distillation can be performed. Thus, it is possible to perform a batch operation and, unlike continuous operation, the operation can be carried out with reduced electric power.

In order for non-condensible gas in the system, such as air, which obstructs heat transfer during evaporation and condensation, to be discharged out of the system efficiently, extraction of gas from the system is periodically performed by opening the control valves V1 and V10 and activating the vacuum pump VP. It has been confirmed by experiment that a reliable evaporative distillation effect can be obtained by performing gas extraction for 60 seconds every 2 hours. However, it has also been found that, in actuality, there is substantially no need for any extraction operation, and it is possible to minimize the operating time of the vacuum pump in the gas extraction.

As shown in FIG. 9 by way of example, when raw water is to be replaced by opening the evaporation can 60 to the atmosphere, switching valves V4 and V5 are switched over to allow the heating medium 13 to flow to an evaporation can 60' connected in parallel to the evaporation can 60, and a control valve V1 and an atmosphere open valve V6 are opened. At this time, a control valve V1'is left closed and the interior of the evaporation can 60' is kept at a predetermined vacuum level. Consequently, the evaporation can 61' is maintained in a vacuum state, and distillation takes place therein. After the raw water 62 has been discharged out of the evaporation can 60, the atmosphere open valve V6 and the extraction valve V1 are closed, and the inside of the evaporation can 60 is depressurized by operating a vacuum pump VP and by opening control valves V1, V3, V10 to introduce raw water into the evaporation can 60. In this way, raw water 62 is renewed. When the raw water 62 has been introduced into the evaporation can 60 to a predetermined level, the control valve V3 is closed. After the pressure in the evaporation can 60 has reached a predetermined degree of vacuum, the control valves V1, V10 are closed, the operation of the vacuum pump VP is stopped and the switching valves V4 and V5 are opened for the evaporation can 60, thereby starting a normal operation. The controller C controls the operation of the vacuum pump VP and opening and closing of these control valves V1–V10. Raw water can also be replaced for the evaporation can 60' by executing a similar operation. Thus, it is possible to perform a rated continuous operation that utilizes a low-temperature waste heat source continuously.

It should be noted that the number of evaporation cans 60' connected in parallel in FIG. 9 is not necessarily limited to one, but two or more evaporation cans 60' may be used. In addition, a plurality of rows of evaporation cans that are arranged in a multi-stage structure as shown in FIG. 4 may be connected in parallel. Thus, it is possible to perform a rated continuous operation utilizing a low-temperature waste heat source continuously as in the case of the above. It is also possible to perform an operation following variations in the waste heat source, for example, an operation in which the quantity of water to be treated is varied by changing the number of evaporation cans to be operated.

As stated above, because electric power used by the desalination apparatus of the invention is mainly such power as is required for the vacuum pump, overall power consumption is minimized. If a batch operation is performed, since the vacuum pump is operated for a predetermined period only at the beginning of the operation to establish a predetermined vacuum degree in the evaporation can, power consumption is minimized particularly effectively. Incidentally, it is not always necessary to provide a vacuum pump separately. In fact, it is possible to make use of a vacuum pump provided in an electric power plant or other similar facilities. It is also possible to provide solar photovoltaic power generation facilities, as described later, without the need for any external power supply. Thus, it is possible to utilize power generation facilities employing natural energy, e.g. solar photovoltaic power generation or wind-power generation facilities, as an electric power source.

Figure 10A:
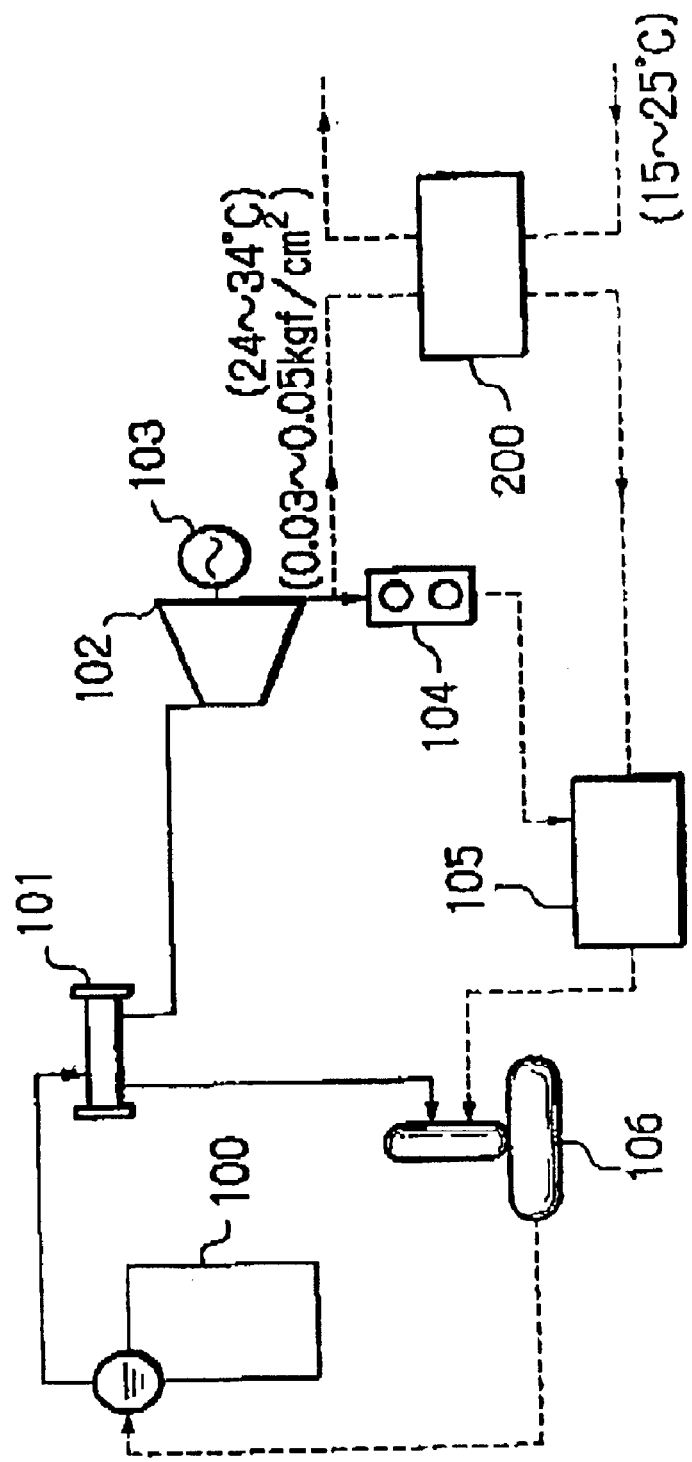

FIG. 10A is a diagram showing a structural example of a system in which the desalination apparatus arranged as stated above is incorporated in parallel to a condenser of a steam turbine for power generation (e.g. a condensing turbine) in an electric power plant. Steam discharged from a boiler 100 is supplied through a steam reservoir 101 to a condensing turbine 102 to drive a generator 103. Steam discharged from the condensing turbine 102 is condensed in a low-pressure steam condenser 104, stored in a condensate tank 105 and returned to the boiler 100 through a deaerator 106.

The desalination apparatus 200 according to the present invention is connected in parallel to the low-pressure steam condenser 104. Desalination is carried out by supplying the desalination apparatus 200 with steam from the condensing turbine 102, which had a pressure of from 0.03 to 0.05 $kg/cm^2$ and a temperature of from 24 to 34° C., as a low-temperature heat source, and sea water having a temperature of 15 to 25° C. as raw water and cooling water. As a result, it was confirmed that the desalination apparatus is capable of efficient desalination. Although in this example the desalination apparatus is incorporated in parallel with the low-pressure steam condenser 104, it should be noted that the desalination apparatus 200 may be incorporated in series to the low-pressure steam condenser 104 as shown in FIG. 10B or the desalination apparatus may be used in place of the low-pressure steam condenser 104 as shown in FIG. 10C. In the latter case, the arrangement may be such that the low-pressure steam condenser 104 is not installed, and all of the low-pressure steam discharged from the condensing turbine 102 is introduced into the desalination apparatus 200.

It should also be noted that the above-described pressure and temperature of steam discharged from the condensing turbine and the temperature of sea water are merely examples, and the pressure and temperature of the low-temperature waste heat source and the temperature of raw water vary according to the kind of low-temperature waste heat source, the region where the system is installed and so on.

Figure 11:
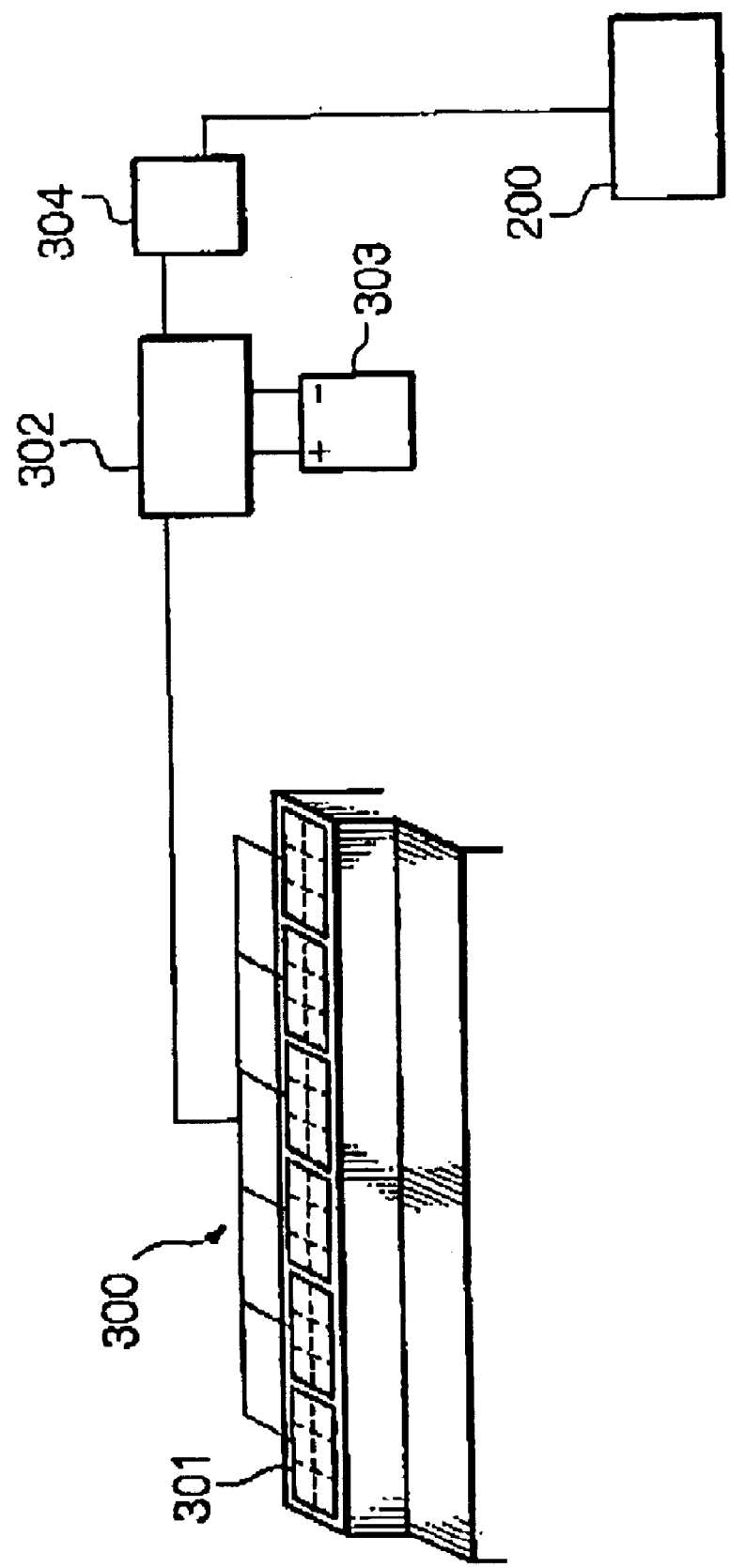
FIG. 11 is a diagram showing an arrangement of a desalination system provided with a solar photovoltaic power generation apparatus.

FIG. 11 is a diagram showing the arrangement of a desalination system provided with a solar photovoltaic power generation apparatus, wherein the desalination apparatus further comprising solar photovoltaic power generation facilities, so that the desalination apparatus uses electric power supplied from the solar photovoltaic power generation facilities as driving electric power.

More specifically, as illustrated in the figure, a solar photovoltaic power generation apparatus 300 with a plurality of solar cells 301 is provided, and electricity generated thereby is stored in a battery 303 through a power generation control panel 302. In addition, driving electric power is supplied to a vacuum pump 304 connected to the vacuum system of the desalination apparatus 200 according to need.

FIGS. 12–15 show constitutional examples of unitized desalination apparatus according to the present invention wherein the components of the desalination apparatus are assembled in a single frame as a unit. The reference characters which are common to FIGS. 1–4, 9 and 12–15 show the same components.

Figure 12:
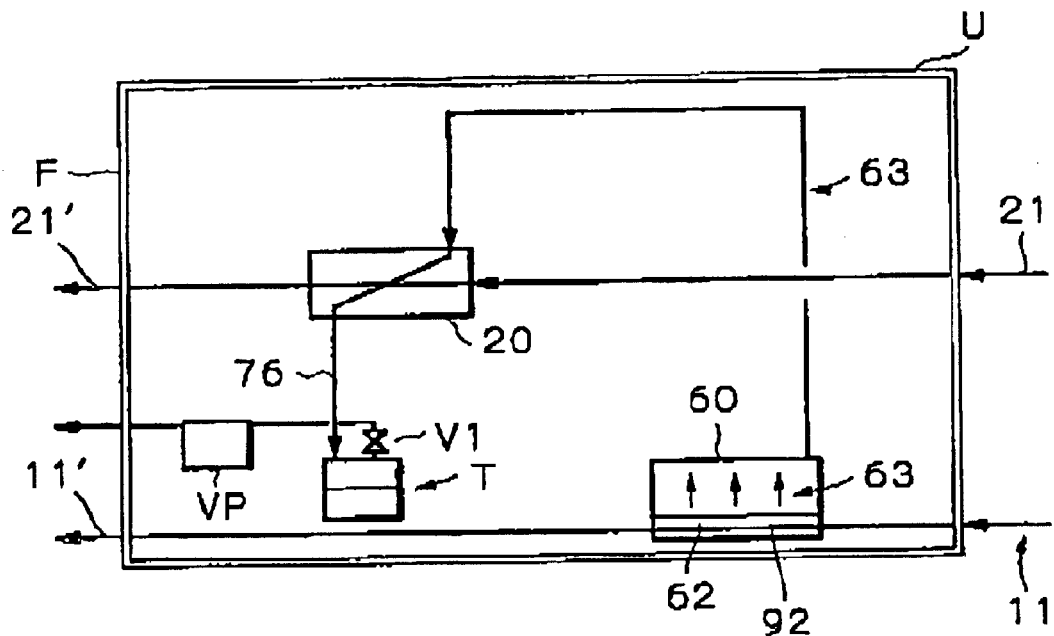
FIG. 12 is a diagram showing an example of a unitized desalination apparatus, wherein apparatus components of a single can-type desalination apparatus are assembled in a single frame.

FIG. 12 shows an example, wherein apparatus components of a single can-type desalination apparatus are assembled in a single frame F. That is, an evaporation can 60, a heat exchanger 92, a condenser 20, a distilled water tank T and a vacuum pump VP shown in FIG. 2 are assembled in a single frame F as a unit U. If desired, a heat exchanger 10 may be assembled in the unit U.

Figure 13:
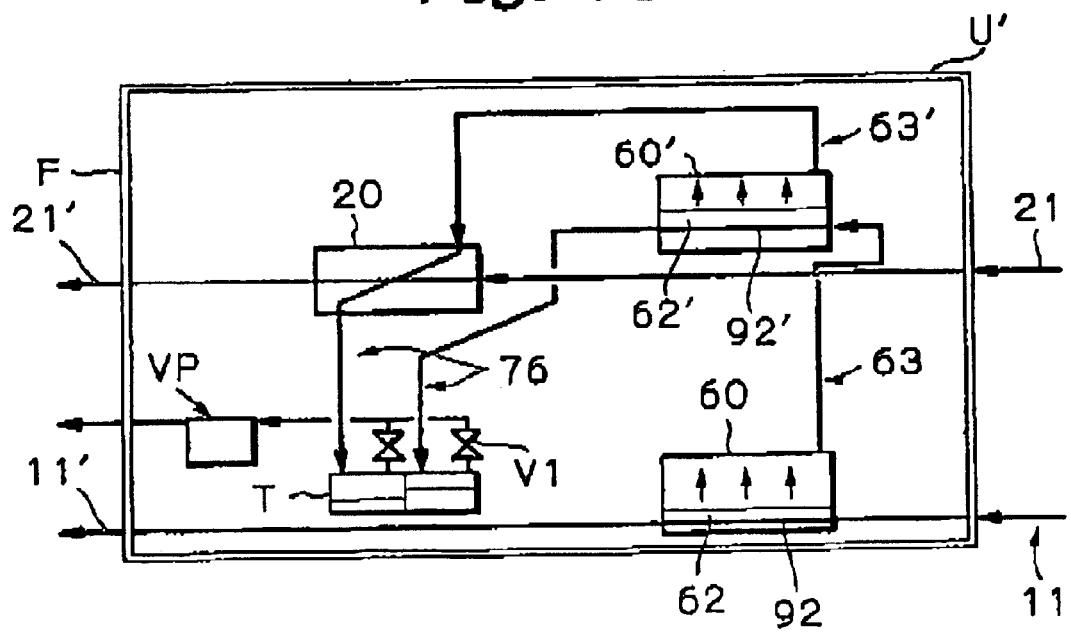
FIG. 13 is a diagram showing an example of a unitized desalination apparatus, wherein apparatus components of a multiple effect can-type (connected in series) desalination apparatus are assembled in a single frame.

FIG. 13 shows an example, wherein apparatus components of a multiple effect can-type (2 stages connected in series) desalination apparatus are assembled in a single frame F. That is, evaporation cans 60, 60'. heat exchangers 92, 92', a condenser 20, a distilled water tank T and a vacuum pump VP shown in FIG. 4 are assembled in a single frame F as a unit U'. If desired, a heat exchanger 10 may be assembled in the unit U' and the number of stages can be increased.

Figure 14:
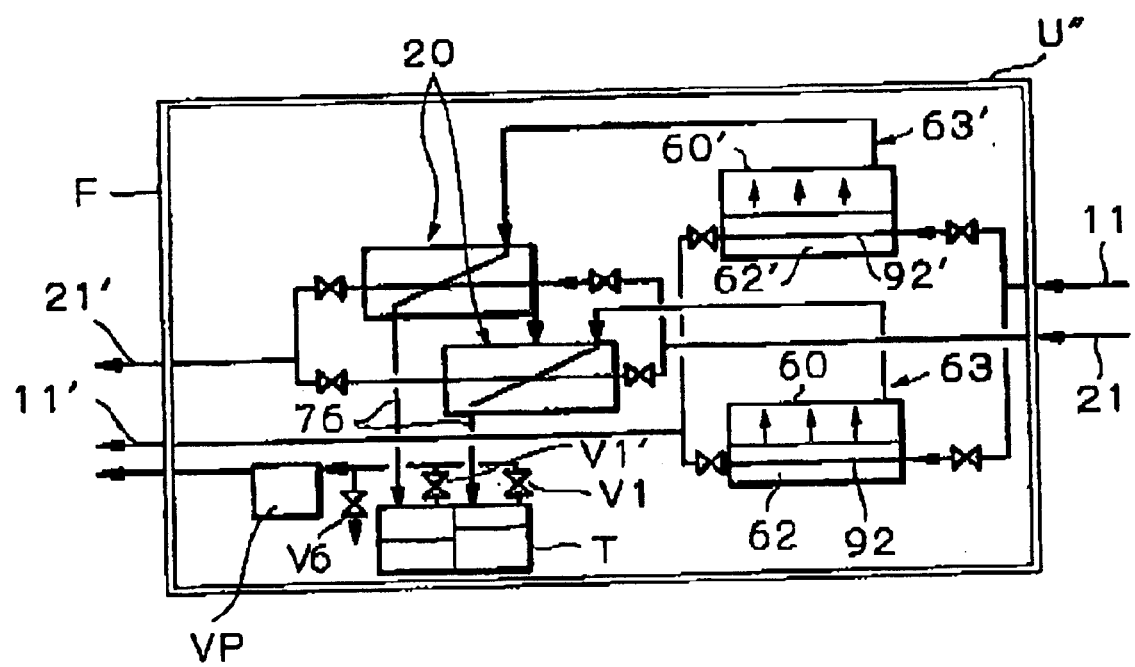
FIG. 14 is a diagram showing an example of a unitized desalination apparatus, wherein apparatus components of a multiple effect can-type (connected in parallel) desalination apparatus are assembled in a single frame.

FIG. 14 shows an example, wherein apparatus components of a multiple effect can-type (2 stages connected in parallel) desalination apparatus are assembled in a single frame F. That is, evaporation cans 60, 60', heat exchangers 92, 92', condensers 20, 20', a distilled water tank T and a vacuum pump VP shown in FIG. 9 are assembled in a single frame F as a unit U". If desired, a heat exchanger 10 can further be assembled in the unit U" and the number of stages can be increased. Also, if desired, a single condenser 20 can be substituted for the two condensers 20, 20.

Figure 15:
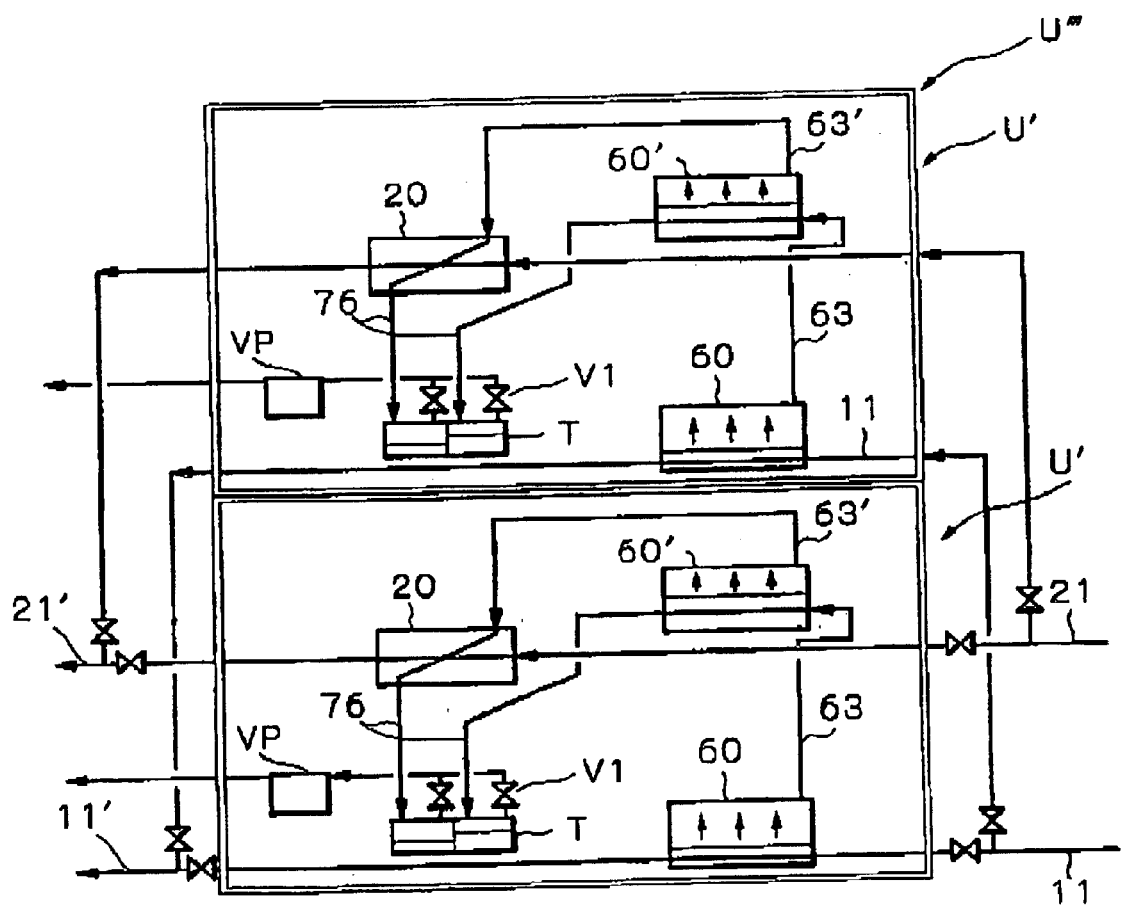
FIG. 15 is a diagram showing an example of a unitized desalination apparatus, wherein plurality of apparatus unitized in a single frame (2 units in the drawing) are further assembled in a single unit.

FIG. 15 shows a constitutional example wherein a plurality of unitized desalination apparatus as described above are further assembled in a single unit U'". In this embodiment, two units U' of multiple effect can-type desalination apparatus shown in FIG. 13 are assembled in an up and down arrangement. Although not shown, units U" of a multiple effect can-type desalination apparatus shown in FIG. 14, wherein plural stages are connected in parallel, may be assembled in a single unit and further, if desired, the number of the stages may be increased therein.

By unitizing the apparatus components in a single unit or by further assembling the unitized apparatus in a single unit as stated above, transportation, carrying in, installation, etc of the apparatus can be made easier. Incidentally, in the above examples, a single vacuum pump VP may be adopted in stead of a plurality of vacuum pumps depending on the performance of the vacuum pump and the capacity of the apparatus.

Figure 16:
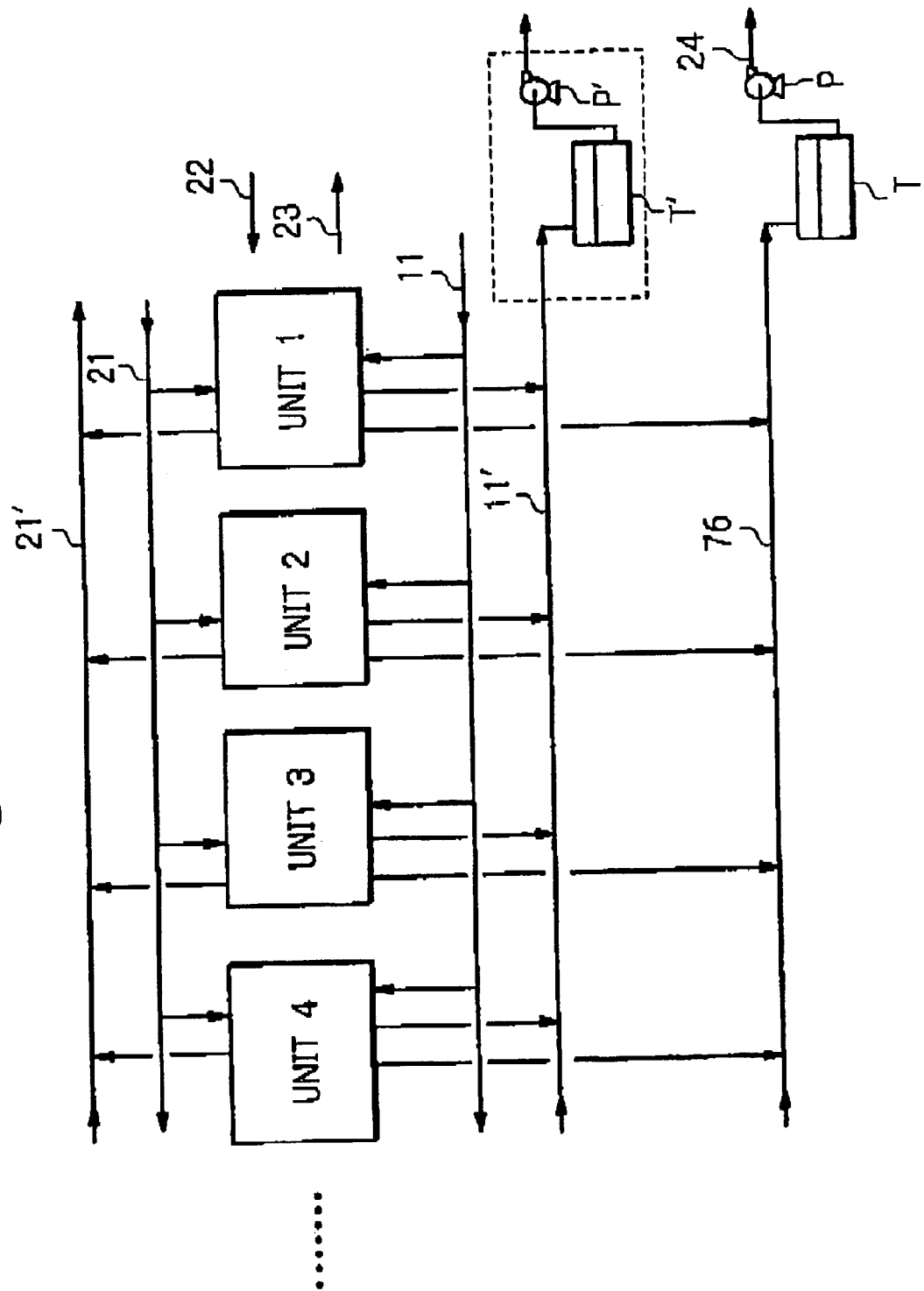
FIG. 16 shows an example of an arrangement of units wherein more than two units are further assembled in a single unit.

FIG. 16 shows an example of arrangement of units wherein more than two units connected in parallel are assembled in a single unit. In FIG. 16, the reference numeral 22 is a raw water, 23 concentrated raw water, T' a heating medium tank, P' a heating medium pump, 24 fresh water, and P a fresh water pump. In a case where the heating medium is used in a liquid phase, the heating medium tank T' and the heating medium pump P' are unnecessary.

EXAMPLE

Figure 17:
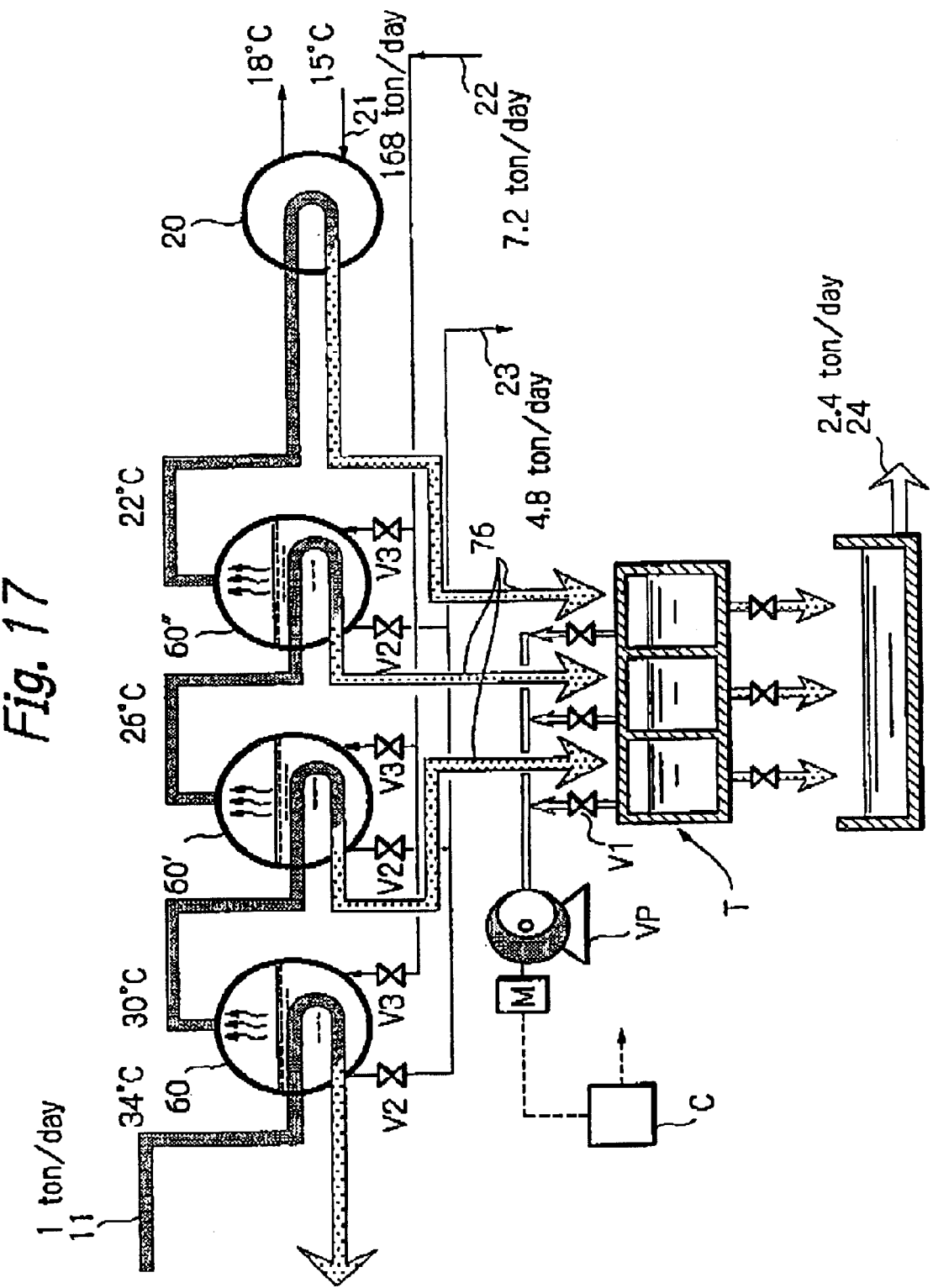
FIG. 17 shows an example of an arrangement in which the present invention is applied to a vacuum evaporation type desalination apparatus using three evaporation cans.

FIG. 17 shows an example in which the present invention is applied to a vacuum evaporation type desalination apparatus using evaporation cans arranged in a triple-effect structure (arranged in series). The same reference characters as those in the foregoing examples denote the same constituent elements.

The operating conditions in this example are as follows.
1) Operating mode
   Batch operation:
   5 hours per batch. Repeated 4 times a day. Changeover time between batch operations is 1 hour. Operating cycle is 24 hours in total.
2) Temperature conditions
   Heat source used: waste vapor 34°C. in temperature
   Cooling water: sea water 15° C. in temperature
3) Vacuum pump
   Scroll vacuum pump 1.5 kW
   Vacuum pump was operated about 30 minutes at the beginning of every 5 hours batch operation.
4) Evaporation can size 1.2 m³/can
   The temperature and flow rate at various portions of the apparatus are as shown in the Figure.

In this example, the amount of distilled water finally obtained by the apparatus was 2.4 Ton/day. The power consumed in the apparatus was 26.37 kwh/day, inclusive of the cooling water pump, and 3.5 kwh/day, exclusive of the cooling water pump (i.e. power of the vacuum pump alone).

As a result, the water-producing capacity was 10.99 kwh/Ton, inclusive of the cooling water pump, and 1.45 kwh/Ton, exclusive of the cooling water pump. The water-producing capacity, exclusive of the power consumed in the cooling water pump, was more than 40 times that of a flash type desalination apparatus using waste hot water and cooling water of the same temperatures as in the example.

INDUSTRIAL APPLICABILITY

As is stated above, the present invention provides the following superior effects:
(1) The desalination apparatus of the present invention uses a low-temperature waste heat source that has heretofore been unused as a heat source, for example, low-temperature waste heat from a thermal or nuclear power plant. Therefore, such heat, which has heretofore been disposed of, can be effectively utilized.
(2) It is possible to ensure an extremely stable supply of a heat source and a cooling source and to perform stable desalination by utilizing low-temperature waste heat discharged from a thermal or nuclear power plant as a heat source for the desalination apparatus and also utilizing sea water as a cooling source for the condenser in the final stage, making use of the conditions of location of thermal or nuclear power plants, which are installed by the sea in view of the transport of a power generating fuel and ensuring a place where waste heat is disposed of (i.e. heat radiating source). Further, as a low-temperature waste heat, cogeneration waste heat and waste heat from an electric power generator in an isolated area (e.g. a camp and etc.) may be used. As a cooling source, a water from a cooling tower may be used or cascade use of the water therefrom is possible.

(3) Cascade use of a low-temperature waste heat source, which is an energy source heretofore unused, makes it possible to suppress the use of fossil fuels and to minimize the generation of global warming gases. Thus, it is possible to provide a resource-recovering technique by desalination that is environmentally friendly.

(4) In the present invention, raw water is stored in an evaporation can, and the inside of the can is depressurized by a vacuum pump. Moreover, the raw water is heated with low-temperature waste heat, thereby enabling evaporation to be promoted at low temperature. Accordingly, it is possible to effect desalination by using low-temperature waste heat from an electric power plant or the like.

(5) In addition, because low-temperature operation can be carried out, even if the temperature difference between a heat source used and cooling water is small, the evaporation efficiency can be improved by employing a multiple-effect evaporation can system and repeatedly using heat.

(6) Furthermore, because raw water stored in an evaporation can is evaporated, an intermittent or batch operation can be performed. Accordingly, power consumption can be reduced markedly. In particular, if the apparatus is operated by a batch mode such that at the time of starting the operation, the inside of the apparatus is evacuated, and at the termination of the operation, the inside of the apparatus is opened to the atmosphere, it is possible to supply raw water into the apparatus and to discharge concentrated water out of the apparatus. Therefore, the apparatus can be basically operated by the operation of the vacuum pump alone. In addition, a vacuum pump is basically operated only for a predetermined period at the beginning portion of the batch operation to establish a predetermined vacuum level in the evaporation can. Accordingly, the power consumption can be further reduced.

(7) Furthermore, a continuous operation can also be performed by operating a plurality of batch-wise apparatuses in parallel by changing over them from one to another.

(8) Since the apparatus can be operated with high efficiency and with low power, the whole apparatus can be unitized in a compact unit. Accordingly, it is easy to transport, carry in and install the apparatus.

What is claimed is:

1. A desalination apparatus operated on a batch operation mode comprising:
   an evaporation can;
   a heat exchanger placed in raw water in said evaporation can so as to subject low-temperature waste heat supplied to said heat exchanger and raw water in the evaporation can to heat exchange and generate water vapor in the evaporation can, said low-temperature waste heat being an exhaust steam from a steam turbine for electric power generation in a plant;
   a condenser connected to said evaporation can to receive the water vapor from said evaporation can, cool the water vapor by subjecting the water vapor and cooling water to heat exchange and obtain distilled water;
   a distilled water tank connected to said condenser for receiving and storing said distilled water;
   vacuum means associated with said evaporation can for evacuating said evaporation can and depressurizing an inside thereof to promote generation of water vapor in said evaporation can;
   raw water supply means provided at said evaporation can for externally supplying raw water into said evaporation can, said raw water supply means comprising a first control valve connected to said evaporation can for supplying raw water into said evaporation can;
   raw water discharge means for opening said evaporation can to the atmosphere for discharging concentrated raw water from said evaporation can, said raw water discharge means comprising a second control valve for opening said evaporation can to the atmosphere; and
   control means for controlling said vacuum means intermittently so that said vacuum means is operated for a predetermined period after concentrated raw water is discharged from said evaporation can, the raw water is supplied into said evaporation can and said evaporation can is closed upon starting of a desalination operation, said control means further configured to control said control valves.

2. A desalination apparatus according to claim 1, wherein said desalination apparatus is incorporated in series or parallel to a condenser of said steam turbine for electric power generation.

3. A desalination apparatus according to claim 1, wherein said desalination apparatus is used for electric power generation.

4. A desalination apparatus according to claim 1, wherein said control means is so arranged that it controls said vacuum and said control valves so that said concentrated raw water is discharged from said evaporation can, the raw water is supplied into said evaporation can, and an evacuation of said evaporation can is performed for a predetermined period upon the starting of the desalination operation.

5. A desalination apparatus according to claim 1, wherein said raw water supply means is formed by said vacuum means and said first control valve connected to a lower part of said evaporation can that is opened or closed by said control means.

6. A desalination apparatus according to claim 1, wherein said concentrated raw water discharge means is connected to a lower part of said evaporation can that is opened or closed by said control means.

7. A desalination apparatus according to claim 1, wherein said evaporation can, heat exchanger, condenser, distilled water tank, vacuum means, raw water supply means and concentrated raw water discharge means are assembled in a single frame as a unit.

8. A desalination apparatus according to claim 1, wherein one of (i) said cooling water is contained in a raw water tank said condenser is placed in the raw water in said raw water tank and (ii) said cooling water is passed through said condenser, to effect said heat exchange with said water vapor.

9. A desalination apparatus according to claim 1 or 8, wherein said evaporation can, heat exchanger, condenser, distilled water tank, vacuum means and raw water supply means are assembled in a single frame as a unit.

10. A desalination apparatus operated on a batch operation mode comprising:
    a plurality of evaporation cans;
    a heat exchanger placed in raw water in an evaporation can so as to subject low-temperature waste heat supplied to said heat exchanger and raw water in the evaporation can to heat exchange and generate water vapor in the evaporation can, said low-temperature waste heat being an exhaust steam from a steam turbine for electric power generation in a plant;

a condenser connected to said evaporation can to receive the water vapor from said evaporation can, cool the water vapor by subjecting the water vapor and cooling water to heat exchange and obtain distilled water;

a distilled water tank connected to said condenser for receiving and storing said distilled water;

vacuum means associated with said evaporation can for evacuating said evaporation can and depressurizing an inside thereof to promote generation of water vapor in said evaporation can;

raw water supply means provided at said evaporation can for externally supplying raw water into said evaporation can, said raw water supply means comprising a first control valve connected to said evaporation can for supplying raw water into said evaporation can;

raw water discharge means for opening said evaporation can to the atmosphere for discharging concentrated raw water from said evaporation can, said raw water discharge means comprising a second control valve for opening said evaporation can to the atmosphere; and control means for controlling said vacuum means intermittently so that said vacuum means is operated for a predetermined period after concentrated raw water is discharged from said evaporation can, the raw water is supplied into said evaporation can and said evaporation can is closed upon starting of a desalination operation, wherein said heat exchanger is connected to a first evaporation can, said condenser is connected to a final evaporation can, and a further condenser is connected to an upstream side evaporation can and placed in raw water in a down-stream side evaporation can in each pair of adjacent evaporation cans, so that said further condenser receives water vapor from said upstream side evaporation can, cools the water vapor with raw water in said downstream-side evaporation can and thereby produce distilled water, and also heats the raw water in said downstream side evaporation can and generates raw water.

11. A desalination apparatus operated on a batch operation mode comprising:

a plurality of evaporation cans disposed in parallel rows each including at least one evaporation can;

a heat exchanger placed in raw water in an evaporation can so as to subject low-temperature waste heat supplied to said heat exchanger and raw water in the evaporation can to heat exchange and generate water vapor in the evaporation can, said low-temperature waste heat being an exhaust stream from a stream turbine for electric power generation in a plant;

a condenser connected to said evaporation can to receive the water vapor from said evaporation can, cool the water vapor by subjecting the water vapor and cooling water to heat exchange and obtain distilled water;

a distilled water tank connected to said condenser for receiving and storing said distilled water;

vacuum means associated with said evaporation can for evacuating said evaporation can and depressurizing an inside thereof to promote generation of water vapor in said evaporation can;

raw water supply means provided at said evaporation can for externally supplying raw water into said evaporation can, said raw water supply means comprising a first control valve connected to said evaporation can for supplying raw water into said evaporation can;

raw water discharge means for opening said evaporation can to the atmosphere for discharging concentrated raw water from said evaporation can, said raw water discharge means comprising a second control valve for opening said evaporation can to the atmosphere; and control means for controlling said vacuum means intermittently so that said vacuum means is operated for a predetermined period after concentrated raw water is discharged from said evaporation can, the raw water is supplied into said evaporation can and said evaporation can is closed upon starting of a desalination operation, wherein said control means is so arranged that it controls said vacuum means and said control valves in such a way that said evaporation cans in all said rows do not simultaneously open to the atmosphere.

* * * * *

UNITED STATES PATENT AND TRADEMARK OFFICE
CERTIFICATE OF CORRECTION

| | | |
|---|---|---|
| PATENT NO. | : 6,833,056 B1 | Page 1 of 1 |
| APPLICATION NO. | : 09/581235 | |
| DATED | : December 21, 2004 | |
| INVENTOR(S) | : Kamiya et al. | |

It is certified that error appears in the above-identified patent and that said Letters Patent is hereby corrected as shown below:

On the title page, the Terminal Disclaimer information has been omitted. Item (45) and the Notice information should read as follows:

--(45) **Date of Patent: *Dec. 21, 2004**

(* ) Notice: Subject to any disclaimer, the term of this patent is extended or adjusted under 35 U.S.C. 154(b) by 0 days.

This patent is subject to a terminal disclaimer.--

Signed and Sealed this

Ninth Day of January, 2007

JON W. DUDAS
*Director of the United States Patent and Trademark Office*